I. STOUT.
Cultivator.
No. {1,088, 32,092.}
Patented Apr. 16, 1861.
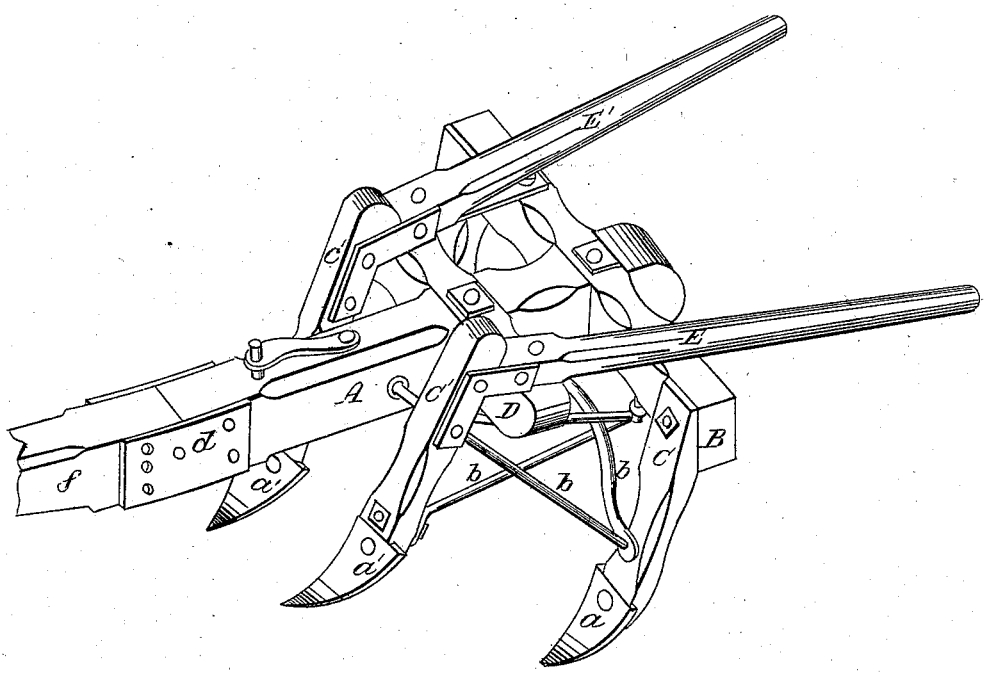
Witnesses
Augustus Pohlers.
Charles Hadaway
Inventor.
Isaac Stout
by his Attorney
Wm. D. Baldwin

UNITED STATES PATENT OFFICE.

ISAAC STOUT, OF TREMONT, ILLINOIS.

IMPROVEMENT IN CULTIVATORS.

Specification forming part of Letters Patent No. 32,092, dated April 16, 1861.

*To all whom it may concern:*

Be it known that I, ISAAC STOUT, of Tremont, Tazewell county, State of Illinois, have invented a certain new and useful Improvement in Cultivators, of which the following is a full, clear, and exact description, reference being had to the accompanying drawing, forming part of this specification, in which is represented a perspective view of a cultivator embracing my improvement.

The object of my invention is to so arrange the front plows or cultivator-teeth that their distance apart in the transverse direction of the furrow may be varied at the will of the operator while the plow is in motion; and my invention for effecting this object consists in attaching the stock of the front cultivators or plows to the handles that serve to guide the cultivator, and pivoting these handles so that the operator, while guiding the cultivator, may vary the distance laterally between these plows, as desired.

By reference to the accompanying drawing my invention will be more fully understood.

My cultivator consists of a beam, A, to the rear end of which is attached a cross-bar, B. Attached to this cross-bar, near the ends and inclined forward, are two stocks, C, which carry a small plow or cultivator-tooth, $a$, at the lower end. These stocks are well braced, by means of iron braces $b$, both to the cross-bar and to the plow-beam. At a proper distance forward of the rear cross-bar a secondary cross-bar, D, is mortised to the plow-beam, and to this cross-bar are pivoted guide-handles E, which extend backward beyond the rear end of the cultivator. These handles extend forward of the secondary cross-bar, and have firmly attached to their ends stocks C', which also carry at their lower ends small plows or cultivator-teeth $a'$. The front plows are placed within the line of the rear plow, so as to form furrows within the outer or rear plows, and they are also well braced to the rear cross-bars and stocks by braces $c$, but so that they may be turned by the handles. By thus arranging the front plows the distance between the furrows formed by them may be changed by means of the handles at any time during the operation of plowing, by which means the soil around grains cultivated by means of plows may be loosened close to the plant, and the position of the plows varied, as desired, so as not to injure the plant when the rows are irregular. To the sides of the front ends of the beam are bolted two plates, $d$, between which is pivoted a tongue, $f$, so that it may be raised and lowered, in order to adjust the line of draft of the plow. Through the front end of the plate, and also through the tongue, are holes, through which a bolt passes in order to hold the tongue in position when adjusted. It will be perceived that in raising this tongue the line of draft is raised and the cultivator makes a deeper furrow in the soil, and that in depressing the tongue and lowering the line of draft a more shallow furrow is made.

Having thus described my improvement in cultivators, what I claim therein as new, and desire to secure by Letters Patent, is—

Attaching the front cultivator-teeth to the guiding-handles of the plow when arranged substantially as described.

In testimony whereof I have subscribed my name.

ISAAC STOUT.

Witnesses:
    MATHIAS TROUT,
    WM. R. LACKLAND.